Dec. 6, 1966   G. M. STANLEY   3,290,052
MULTI-AXLE TRAILERS
Filed June 16, 1964
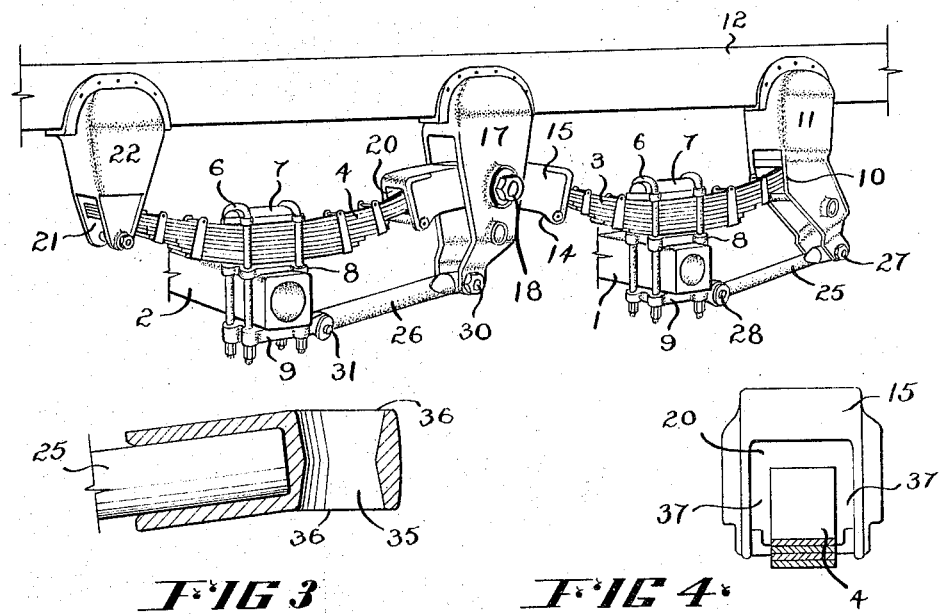
FIG 1
FIG 3   FIG 4
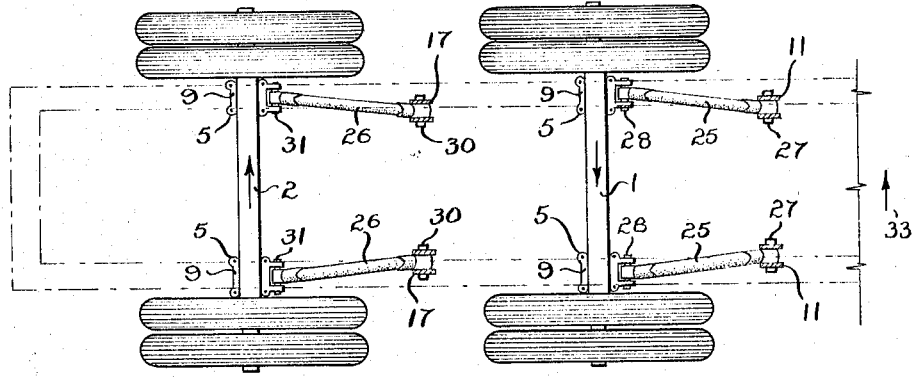
FIG 2
INVENTOR
GEOFFREY M. STANLEY
BY Oldham & Oldham
ATTYS.

3,290,052
MULTI-AXLE TRAILERS
Geoffrey M. Stanley, Brighton, South Australia, Australia, assignor to Stanley Steel Company Limited, Brighton, South Australia, Australia
Filed June 16, 1964, Ser. No. 375,559
Claims priority, application Australia, June 18, 1963, 32,016/63
2 Claims. (Cl. 280—104.5)

This invention relates to improvements in and to multi-axle trailers, that is a group of axles which are disposed remote from the steering point of a vehicle and include at least two axles one immediately in front of the other.

Trailer axles which carry the ground wheels, are usually carried on springs engaging suitable bearing members on the chassis of the vehicle and including a rocker to allow the weight carried by the axles to be correctly distributed in relation to the trailer frame, it being customary also in such assemblies to use radius arms between the axles and brackets engaged by the springs, which radius arms serve to keep the axles in a required operating position in relation to the trailer frames.

One of the problems however, with multi-axle trailers is that when turning, considerable drag takes place on the tyres of the wheels of the trailer because the axles must of necessity have endwise loading because of their attachment to the trailer chassis in close proximity to each other.

It is the object of this invention to provide certain improvements to the axle control means which will give a limited degree of steering of the axles when turning and while it is the object to take care only of small changes in direction as encountered when normal travelling takes place, it will be realised that such compensation can be of very considerable importance because it is the constant minor changes in direction which take place when driving which cause considerable wearing on the tyres of the trailer.

The objects of the invention are achieved by using springs in a more or less normal manner which have their ends carried in brackets engaging the chassis of the trailer and including a rocker between adjacent ends of the springs which will allow the height of the axles in relation to the chassis to adjust, the radius arms being again used as heretofore, but instead of the radius arms being in a plane coincident with the plane in which the chassis members run, or parallel thereto, being set at an angle such that these radius arms are not parallel when viewed vertically but are at an angle to each other.

The angle is so selected that when there is any endwise movement of the axle to which the radius arms are joined, the axle will be turned slightly into the direction of the turning force exerted by the chassis.

In other words the radius arms of each axle are disposed at an angle to each other so that if the axle moves in an endwise or axial direction, it will simultaneously be turned because of the angle of the radius arms.

In further explanation of the invention it can be stated that with trailing radius arms, their attachment points to the brackets on the chassis are closer together than their attachment points to the axle, from which it will be obvious that as the chassis is moved forward, the axle will be at right angles to the chassis when there is no endwise force on the axle, but when the axle is pushed in one direction, the two radius rods will have the ends which are attached to the axles displaced, the one moving into a position approaching a right angle to the axle and the other assuming a more acute angle, from which it will be obvious that the radius arm which approaches the right angle to the axle will have a greater effective length than the radius arm which is at an angle to the axle, thus pulling that part of the axle to which the arm with a greater angle is attached forwardly and steering the vehicle axle.

As during the turn obviously the one axle will be moved in one direction and the other axle in the opposite direction it will be obvious that the two axles are oppositely steered and therefore the sliding motion which would otherwise exist on the wheels is countered by this steering action.

As stated previously with trailing radius arms, that is radius arms which are connected to the chassis forward of the axle, the attachment points on the axle are spaced wider apart than the attachment points to the chassis, and from this it will follow also, that if pusher radius arms are used on the axle, the position would be reversed and the attachments to the axle would be closer together than the attachments to the chassis.

It will be clear however, that the arrangement is such that when an axle is pushed endwise to either the right or the left, the wheel in the direction in which it is pushed must move in a forward direction and the other wheel back to provide the correct steering direction.

It is obvious that constructional features of the invention can be considerably varied and it will be realised that limiting means for the movement of the axle must be provided which can conveniently be achieved by limiting the movement of the springs on their supporting means, and similarly it will be realised that the connections of the radius arms to the axle and to the brackets of the chassis must be so arranged that the required angulation is possible.

To enable the invention to be more fully understood, an embodiment thereof will now be described with reference to the accompanying drawings, in which:

FIG. 1 is a perspective view of an axle assembly at one side of a trailer, showing the axle support means from the vehicle and also the axle control radius arms, FIG. 2 is a schematic plan of a trailer having two axles and showing how each is controlled by the radius rods, the arrows showing the relative axle displacement direction when a turning force is applied to the trailer, FIG. 3 is an enlarged section of one end of a radius rod showing the shape of the bearing to allow angulation, and, FIG. 4 is an end view of the centre rocker showing the spring in section, this view showing how the end of the spring is given sidewise movement in the rocker, as it is also in the main brackets to allow the axial displacement of the axles to take place.

The axles 1 and 2 are connected to the forward springs 3 and the rear springs 4 respectively by clamping bolts 6 which pass through clamping plates 7, 8 and 9, the clamping plates 8 joining the respective axles 1 or 2 to the respective springs 3 or 4, there being such a clamping unit at each connection plate between the springs and axles.

The front ends of the axles 3 engage in sockets 10 in brackets 11 which are secured to the frame 12 of the vehicle (only one side of the trailer being of course shown), while the rear ends of the springs 3 engage in the forward socket 14 of a rocker 15, the rocker 15 being carried by a bracket 17, again secured to the frame 12 of the vehicle, a pivot bolt 18 actually connecting the rocker 15 to the bracket 17 to allow the rocker to swing about the pivot bolt 18 to compensate for up and down motion between the two axles 1 and 2.

The rear axle 2 has its springs 4 engaged at the front ends in sockets 20 in the rockers 15 while the rear ends of these springs engage in sockets 21 in rear brackets 22 again secured to the frame 12 of the vehicle.

The various sockets which accommodate the ends of the springs must be arranged to allow both sideways and endwise movement of the springs.

The axles 1 and 2 are held in their operative position by two pairs of radius rods 25 and 26, the front rods 25 having their ends connected by pivot pins 27 to the brackets 11 and their rear ends connected by pivot pins 28 to the clamping plates 9 of the front axle fixing means.

The rear pair of radius rods 26 have their front ends connected to the brackets 17 by pivot pins 30 on the middle brackets 17, while their rear ends are connected to the clamping plates 9 of the rear spring fixing means by pivot pins 31.

It will be noted that the radius rods 25 and 26 are closer together at their front pivot pins 27 and 30 respectively than at their rear pivot pins 28 and 31, so that the radius rods of each pair are outwardly inclined in a rearward direction.

Considering a turning motion on the vehicle frame 12 as shown by the arrow 33 it will be realised that taking the reaction about the rear axle 2, the axle 1 will tend to move in the direction of the arrow on that axle within the limits of the movement allowed by the springs while the movement of the rear axle 2 about the axle 1 will be in the opposite direction as shown by the arrow on the axle 2. Both axles will thus steer oppositely into the direction of turning of the vehicle frame.

The front and rear ends of the radius rods 25 and 26 are constructed as shown in FIG. 3, that is they have the bore 35 tapering inwards from each face 36 so that the radius rods can angulate on the pivot pins 27, 28, 30 and 31.

The width of the sockets 14 and 20 at the two ends of each rocker 15 are greater than the width of the springs 3 and 4 so that gaps 37 are left on each side of the springs to permit the springs to move sideways to allow the limited endwise axle movement necessary to effect the steering under influence of the angulated radius rods 25 and 26.

While the foregoing construction is a convenient one, it will be realised that other spring mounts could be used to permit the axles to move axially, and also, as stated earlier, the radius rods could be arranged differently, such as to the rear of the axles, to still obtain the slight turning of the axles.

It will also be realised that the trailer axles could be greater in number than the pair described, such as three axles, but then the centre axle need not steer.

The invention can be applied anywhere where multiple trailer axles are disposed some distance from the steering point of the vehicle, which steering point can be attained by pivoting the trailing vehicle to a prime mover, or the vehicle could itself be self-propelled and can then include a main steering axle remote from the multiple trailer axles.

What I claim is:

1. Improvements in multiple-axle trailer vehicles in which at least a pair of trailer axles are positioned remote from the steering point of the trailer axles, characterised by steering means for the said axles operated by endwise thrust on the said axles due to the vehicle turning action, the mechanism for effecting said steering comprising, a pair of springs for said axles towards the ends of said axles, means joining the springs to the said axles, brackets secured to said vehicle engaging said springs to allow movement of said springs in said brackets to permit sideways or endwise movement of said axles, a radius rod adjacent each said spring having one end coupled to said axle and the other end coupled to an offset portion of one of said brackets forwardly of the axle whereby the radius rods are angled one in relation to the other so that when the relevant axle is moved endwise the axle is also given a steering action.

2. Improvements in multiple-axle trailer vehicles in which at least a pair of trailer axles are positioned remote from the steering point of the trailer axles, characterised by steering means for the said axles operated by endwise thrust on the said axles due to the vehicle turning action, the mechanism for effecting said steering comprising, a pair of springs for said axles towards the ends of said axles, means joining the springs to the said axles, brackets secured to said vehicle engaging said springs to allow movement of said springs in said brackets to permit sideways or endwise movement of the axles, a radius rod adjacent each said spring having one end coupled to said axle and the other end coupled to a bracket, the radius rods projecting forwardly of said axle and being angled one in relation to the other so that the forward ends of said radius rods are closer together than the rear ends which engage the springs whereby when the relevant axle is moved endwise the axle is also given a steering action.

References Cited by the Examiner

UNITED STATES PATENTS

| | | | |
|---|---|---|---|
| 2,750,201 | 6/1956 | Hagedorn | 280—104.5 |
| 2,954,985 | 10/1960 | Drong | 280—104.5 |
| 3,134,606 | 5/1964 | Oyler | 280—104.5 |

BENJAMIN HERSH, *Primary Examiner.*

P. GOODMAN, *Assistant Examiner.*